(12) United States Patent
Paulson et al.

(10) Patent No.: US 9,535,872 B2
(45) Date of Patent: Jan. 3, 2017

(54) PHYSICAL CHASSIS AS A DIFFERENT NUMBER OF LOGICAL CHASSIS

(75) Inventors: Dave W. Paulson, Applegate, CA (US); Robert N. Barry, Cool, CA (US); Naysen J. Robertson, Orangevale, CA (US); Stephen B. Lyle, Granite Bay, CA (US); Robert D. Odineal, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 2125 days.

(21) Appl. No.: 12/639,857

(22) Filed: Dec. 16, 2009

(65) Prior Publication Data

US 2011/0145332 A1 Jun. 16, 2011

(51) Int. Cl.
*G06F 15/16* (2006.01)
*H04Q 1/10* (2006.01)

(52) U.S. Cl.
CPC .............. *G06F 15/161* (2013.01); *H04Q 1/10* (2013.01)

(58) Field of Classification Search
USPC .................................................. 709/204–211
See application file for complete search history.

(56) References Cited

U.S. PATENT DOCUMENTS

| 7,240,364 | B1* | 7/2007 | Branscomb et al. | 726/9 |
| 8,127,128 | B2* | 2/2012 | Bristow et al. | 713/100 |
| 2003/0101304 | A1* | 5/2003 | King et al. | 710/301 |
| 2004/0024831 | A1* | 2/2004 | Yang et al. | 709/208 |
| 2009/0287791 | A1* | 11/2009 | Mackey | 709/209 |
| 2010/0306521 | A1* | 12/2010 | El Zur et al. | 713/2 |

* cited by examiner

*Primary Examiner* — Joseph Greene
(74) *Attorney, Agent, or Firm* — Conley Rose, P.C.

(57) ABSTRACT

A system includes a first physical chassis comprising a first chassis management unit ("CMU"). The first CMU is configured to communicate with a second CMU in an additional physical chassis. The first CMU is also configured to communicate for the first physical chassis and the additional physical chassis as one logical chassis.

17 Claims, 3 Drawing Sheets

Physical View

Logical View

_US 9,535,872 B2_

PHYSICAL CHASSIS AS A DIFFERENT NUMBER OF LOGICAL CHASSIS

BACKGROUND

Chassis management refers to the process of maintaining server health through control of server blades, power supplies, cooling fans, networking switches, etc. by continuously monitoring temperature sensors, power status, voltages, fan speed, basic input/output system ("BIOS") information, operating system information, etc. As the number of chassis in a system increase, chassis management complexity increases as well, especially in terms of human hours devoted to diagnosis and repair.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical, or wireless electrical connection. Thus, if a first system couples to a second system, that connection may be through a direct electrical connection, through an indirect electrical connection via other systems and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

An enormous amount of resources can be saved by simplifying chassis management from the perspective of both humans and software. As such, proxying of chassis is disclosed. Being able to interact with multiple chassis as a single chassis allows for programming efficiencies, training efficiencies, troubleshooting efficiencies, communication efficiencies, repair efficiencies, and replacement efficiencies. For ease of discussion, the proxying of two physical chassis into one logical chassis is highlighted. However, any number of logical or physical chassis can be proxied into any number of logical chassis using the information provided herein.

Figure 1A:
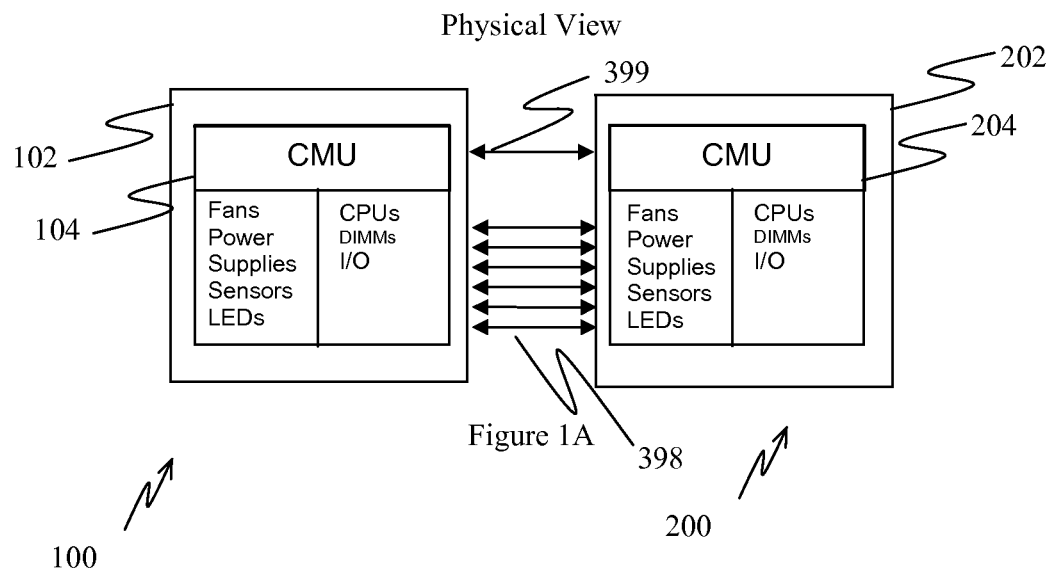
FIG. 1A illustrates a physical view of two physical chassis as one logical chassis.

FIG. 1A illustrates the physical view of two physical chassis proxied as one logical chassis. A system 100 comprises a first physical chassis 102. A chassis comprises devices associated with computing and a support structure for the devices. The first physical chassis 102 comprises devices such as central processing units ("CPUs"), dual inline memory modules ("DIMMs"), fans, bulk power supplies, I/O slots, etc. The quantity of each can be varied as desired. Additionally, the first physical chassis 102 comprises a first chassis management unit ("CMU") 104. The CMU comprises a baseboard management controller ("BMC"). A BMC comprises a microcontroller embedded on a motherboard, and the BMC manages the interface between chassis-management software and hardware. Different types of sensors provided in or near the chassis report to the BMC on parameters such as temperature, fan speeds, power, operating system status, etc. The BMC also monitors Internet status (e.g., discovering network nodes, identifying status of the network nodes, identifying network conditions, monitoring information of the network nodes, such as IP address, domain names, Internet flow, etc.) and static information (e.g., information about CPUs, random access memory ("RAM"), hard disk drives, compact disc read only memory ("CD-ROM") drives, network interface cards, display cards, operating systems, etc.). The BMC outputs alerts (e.g., message dialog boxes, emails, warning tones, short message service ("SMS") messages, etc.) to administrators if any of the parameters do not stay within preset limits configurable by administrators. In at least one embodiment, administrators remotely communicate with the BMC to take corrective action after reviewing logs of the warning events created by the BMC.

In at least one embodiment, the system 100 comprises a server. The first CMU 104 is configured to communicate with a second CMU 204 in a second physical chassis 202. The system 100 couples to another system 200 with a set of cables 398 to become a logically larger server. A management cable carries miscellaneous signals for clocks, resets, etc. The two-chassis configuration can be de-populated as well, e.g., back into the logically smaller servers in various embodiments. The systems 100 and 200 can be identical for ease of use, swapping for repair or replacement, etc.

The management cable is asymmetrical. As such, each chassis 102, 202 can determine from the management cable whether it should be master or slave. For example, the two end connectors of the management cable may have a different number of pins. Each chassis 102, 202, after identifying the number of pins in the connector to which the chassis is immediately connected, determines whether the chassis is master or slave. For ease of discussion, the first physical chassis 102 is the master and the second physical chassis 202 is the slave. Both chassis 102, 202 comprise two front-panel light-emitting diodes ("LEDs"): a "master" LED and a "joined" LED. The master LED will only light on the chassis that is the master chassis. The joined LED will light on both chassis when successfully coupled. If decoupled, the CMU in each coupled chassis is able to operate independently. If coupled, a host operating system discovers an extended hardware list during normal system inventory.

A local area network ("LAN") cable 399 couples the first CMU 104 and the second CMU 204. The first CMU 104 is configured to communicate with the second CMU 204 via a private LAN, and the first CMU 104 is configured to operate as a master CMU upon initialization with the second CMU 204. In various embodiments, the LAN is enabled by dedicated or shared network-interface cards ("NICs") on the master and/or slave chassis.

Figure 1B:
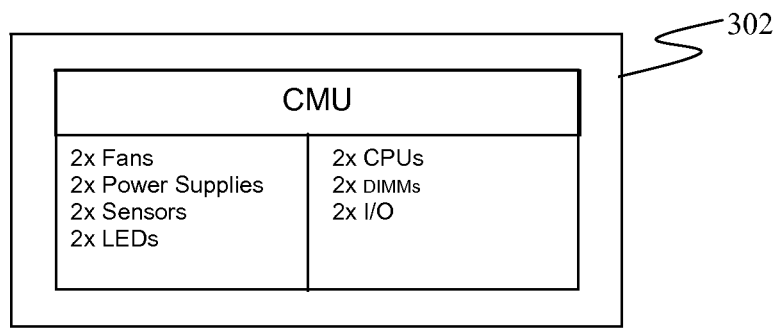
FIG. 1B illustrates a logical view of two physical chassis one logical chassis.

FIG. 1B illustrates the logical view of two physical chassis proxied as one logical chassis. The first CMU 104 is configured to receive requests for the first physical chassis 102 and the second physical chassis 202 as one logical chassis 302. A request can be a command, query, instruction, communication, etc. for a particular device or chassis. To operating systems and applications, both chassis 102, 202 appear as one logical chassis 302 comprising the devices of each chassis 102, 202. If the physical chassis 102, 202 are coupled during operation, the CMU on the master chassis, i.e., the master CMU 104, reinitializes communication with operating systems and applications such that the operating systems and applications send requests to the one logical chassis 302. As such, requests addressed to the one logical chassis 302 are received by the first physical chassis 102 and first CMU 104. Because the second CMU 204 only responds to queries from the first CMU 104, requests are forwarded to the first CMU 104 from the second CMU 204 if delivered from an application to the second CMU 204 in at least one embodiment. If the physical chassis 102, 202 have the same number of each device type, the one logical chassis 302 comprises two times the number of each device type (illustrated as "2x" in FIG. 1B). If the physical chassis 102, 202 have a different number of, e.g., fans, the number of fans on the one logical chassis 302 would be the sum of the number of fans on each chassis 102, 202.

Considering operation, based on a particular request, the first CMU 104 sends a query to the second CMU 204. For example, if an application requests the temperature of one of the CPUs on the second physical chassis 202, the first CMU 104 queries the second CMU 204 for the data. Based on the query, the first CMU 104 receives a reply from the second CMU 204. For example, the second CMU 204 provides the temperature of the CPU to the first CMU 104 based on the query, and the first CMU receives the temperature as a reply. Based on the reply, the first CMU 104 sends a response to the first request as if the first physical chassis 102 and the second physical chassis 202 were the one logical chassis 302. For example, the first CMU 104 sends the temperature to the application and references the CPU as if it were part of the one logical chassis 302.

In at least one embodiment, requests refer to devices of a first type on the first physical chassis 102 via a first set of consecutive integers. For example, devices of a first type may be CPUs, and the CPUs may be designated with the set {0, 1}. The requests refer to devices of the first type on the second physical chassis 202 via a second set of consecutive integers. For example, the CPUs on the second physical chassis are designated with the set {2, 3}. As such, the proxying of the two chassis 102, 202 as one logical chassis 302 is kept intact because the first request need not address any particular chassis 102, 202, merely a CPU number. The first CMU 104 ensures that the appropriate CPU is targeted. For ease of processing, the elements of the first set are mutually exclusive with the elements of the second set. For example, no CPU is designated with the same number. Also, the last element of the first set and the first element of the second set are consecutive. Referring to the above example, 1 and 2 are consecutive. Instead of integers, addresses, alpha-numeric strings, alphabet strings, etc. are used in at least some embodiments. For more than one slave chassis, internal addressing is based on the identification of the private LAN connections in at least one embodiment. For example, internal addressing is based on port number on a network switch or multi-port network interface card.

In this way, if each physical chassis 102, 202 comprises two CPUs numbered 0 and 1, the one logical chassis 302 comprises CPUs numbered 0 through 3. Any descriptions or lists of chassis components accessible by applications outside the chassis will be presented as a single consecutively numbered list as opposed to chassis-specific lists where numbers are repeated. As such, references to particular chassis can be eliminated altogether. If for some reason, outside agents require knowing the identity of a particular physical chassis, a sensor data record can be used as a reference. The data record comprises a public portion and a private portion, the public portion referring to the first physical chassis 102 and the second physical chassis 202 as the one logical chassis 302, the private portion referring to the first physical chassis 102 and the second physical chassis 202 as two logical chassis. The data record can also be used as a lookup table by the first CMU 104 as well. The data record comprises a field to indicate to which chassis a given sensor physically belongs. In at least one embodiment, the field comprises text strings for chassis description.

In at least one embodiment, requests are in a server manageability interface format. Service manageability requests comprise a header. The first CMU 104 is configured to adjust two bits in the header based on whether the first request is associated with the first physical chassis 102 only, the second physical chassis 202 only, or both the first physical chassis 102 and the second physical chassis 202. However, any portion of a request including the entire request may be altered, transformed, encapsulated, etc. in order to facilitate communication between the chassis 102, 202 but maintain to outside agents that the two physical chassis 102, 202 comprise one logical chassis 302.

The first CMU 104 is configured to disable features on the second physical chassis 202 in at least one embodiment. A feature is any service, routine, or set of instructions provided or carried out by a chassis or CMU. For example, the first CMU 104 disables sensor scan loop control operations performed by the second CMU 204. A "sensor scan loop" refers to the active monitoring of various sensors in a chassis. In at least one embodiment, the first CMU 104 forwards a "scan sensor" command to the second CMU 204. As such, both CMUs 104, 204 run the sensor scan loop only for their respective chassis 102, 202, i.e., locally, but the second CMU 204 only runs the loop on command from the first CMU 104. The first CMU 104 is still the entity that reports all sensor readings to outside agents, but the first CMU 104 only retrieves readings from second CMU's 204 latest sensor scan loop. This embodiment allows for local critical reactions (e.g., hard shutdowns), allows for local fan control via related sensors, and allows for greater efficiency and simplicity of operation.

Figure 2:
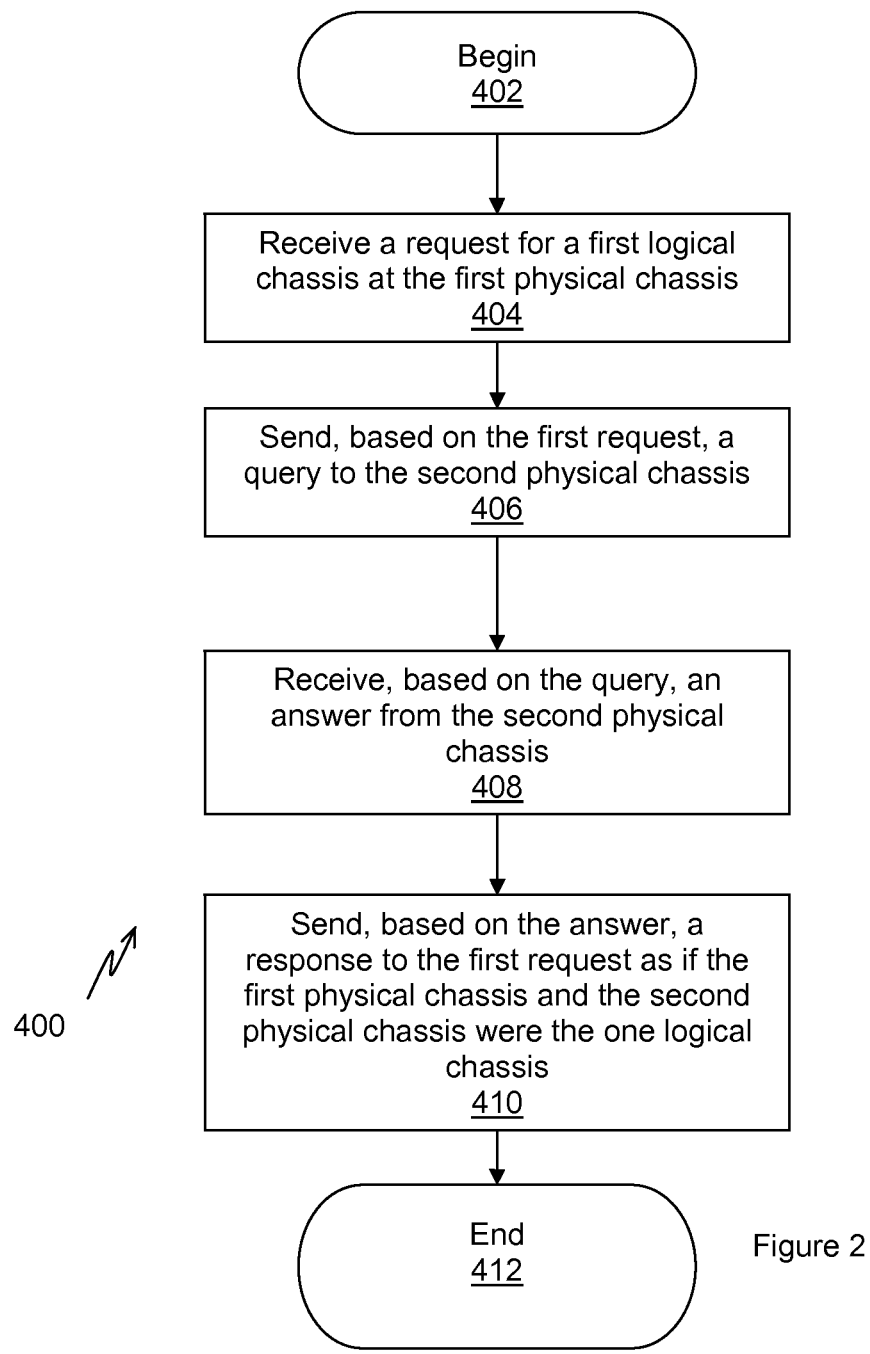
FIG. 2 illustrates a method of proxying two physical chassis as one logical chassis.

FIG. 2 illustrates a method 400 of proxying chassis beginning at 402 and ending at 412. At 404, a request for one logical chassis is received. In at least one embodiment, the request refers to devices of a first type on the first physical chassis via a first set of consecutive integers, the number of devices of the first type on the first physical chassis corresponding with the elements of the first set on a one-to-one basis. Additionally, the request refers to devices of the first type on the second physical chassis via a second set of consecutive integers, the number of devices of the first type on the second physical chassis corresponding with the elements of the second set on a one-to-one basis. The elements of the first set are mutually exclusive with the elements of the second set, and the last element of the first set and the first element of the second set are consecutive. In at least one embodiment, receiving the request comprises receiving the request in a server manageability interface format. As such, the request comprises a header. The method 400 further comprises adjusting two bits in the header based on whether the request is associated with the first physical chassis only, the second physical chassis only, or both the first physical chassis and the second physical chassis.

At 406, a query to the second physical chassis is sent based on the request. Sending the query comprises referencing a data record. In at least one embodiment, the data record comprises a public portion and a private portion. The public portion refers to the first physical chassis and the second physical chassis as the one logical chassis while the private portion refers to the first physical chassis and the second physical chassis as two logical chassis. Sending the query comprises sending the query to the second physical chassis, and receiving the answer comprises receiving the answer from the second physical chassis. At 408, an answer from the second physical chassis is received based on the query. At 410, a response to the request from the first physical chassis and the second physical chassis as the one logical chassis is sent based on the answer. In at least one embodiment, the method 400 includes disabling a feature on the second physical chassis.

Figure 3:
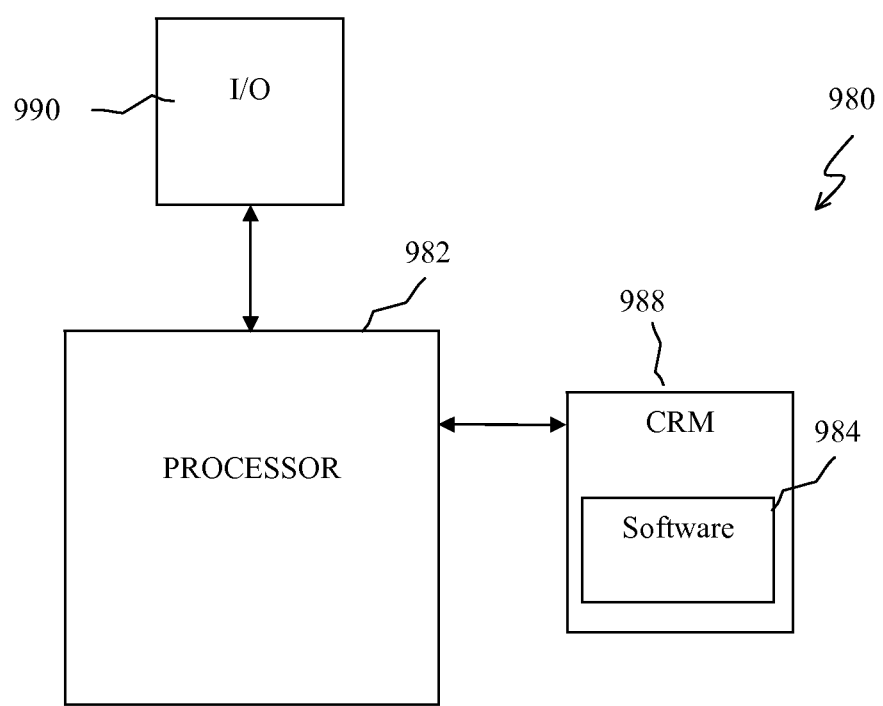
FIG. 3 illustrates machine-readable storage medium used for proxying physical chassis as a different number of logical chassis.

The system described above may be implemented on any computer with sufficient processing power, memory resources, and throughput capability to handle the necessary workload placed upon the computer. FIG. 3 illustrates a computer 980 suitable for implementing one or more embodiments disclosed herein. The computer system 980 includes a processor 982 (which may be referred to as a central processor unit or CPU) that is in communication with memory devices including storage 988, and input/output (I/O) 990 devices. The processor may be implemented as one or more CPU chips. For example, the processor performs the function of a CMU.

In various embodiments, the storage 988 comprises a machine-readable storage medium such as volatile memory (e.g., RAM), non-volatile storage (e.g., Flash memory, hard disk drive, CD ROM, etc.), or combinations thereof. In at least one embodiment, the storage 988 comprises a machine-readable storage medium comprising computer-executable instructions that, when executed by a processor, cause the processor to perform any action described in this disclosure. For example, the storage 988 comprises software 984 that is executed by the processor 982.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a first physical chassis comprising a first chassis management unit ("CMU");
wherein the first CMU is to communicate with a second CMU in an additional physical chassis; and
wherein the first CMU is to communicate for the first physical chassis and the additional physical chassis as one logical chassis; and
a data record, wherein the data record comprises a public portion and a private portion, the public portion referring to the first physical chassis and the additional physical chassis as the one logical chassis, the private portion referring to the first physical chassis and the additional physical chassis as two logical chassis,
wherein devices of the first CMU and devices of the second CMU are operated as mutually exclusive sets of devices, and
wherein the second CMU disables a feature on the additional physical chassis upon detection that the second CMU is to operate as a slave CMU.

2. The system of claim 1, wherein the first CMU is to operate as a master CMU upon initialization with the second CMU.

3. The system of claim 1, wherein the first CMU is to communicate with the second CMU via a local area network.

4. The system of claim 1,
wherein, based on a first request, the first CMU is to send a query to the second CMU;
wherein, based on the query, the first CMU is to receive a reply from the second CMU; and
wherein, based on the reply, the first CMU sends a response to the first request for the first physical chassis and the additional physical chassis as the one logical chassis.

5. The system of claim 1,
wherein a communication refers to devices of a first type on the first physical chassis via a first set of consecutive integers, the number of devices of the first type on the first physical chassis corresponding with the elements of the first set on a one-to-one basis;
wherein the communication refers to devices of the first type on the additional physical chassis via an additional set of consecutive integers, the number of devices of the first type on the additional physical chassis corresponding with the elements of the additional set on a one-to-one basis;
wherein the elements of the first set are mutually exclusive with the elements of the additional set; and
wherein the last element of the first set and the first element of the additional set are consecutive.

6. The system of claim 1,
wherein a first request is sent in a server manageability interface format;
wherein the first request comprises a header;
and wherein the first CMU is to adjust at least one bit in the header based on whether the first request is associated with the first physical chassis but not the additional physical chassis, the additional physical chassis but not the first physical chassis, or the first physical chassis and the additional physical chassis.

7. The system of claim 1, wherein the first CMU is to disable a feature on the additional physical chassis.

8. The system of claim 1, wherein the second CMU disables a feature on the additional physical chassis upon detection that the second CMU is to operate as a slave CMU.

9. A non-transitory machine-readable storage medium comprising computer-executable instructions that, when executed by a processor, cause the processor to:
receive a first request for one logical chassis;
send, based on the first request, a query to an additional physical chassis;
receive, based on the query, a reply from the additional physical chassis; and
send, based on the reply, a response to the first request for a first physical chassis and the additional physical chassis as the one logical chassis, wherein sending the query comprises referencing a data record, wherein the data record comprises a public portion and a private portion, the public portion referring to the first physical chassis and the additional physical chassis as the logical chassis, the private portion referring to the first physical chassis and the additional physical chassis as two logical chassis, wherein the processor is caused to disable a feature on the additional physical chassis upon detecting that the additional physical chassis is to operate as a slave physical chassis, and wherein devices of the first physical chassis and devices of the additional physical chassis are operated as mutually exclusive sets of devices.

10. The non-transitory storage medium of claim 9, wherein the first request refers to devices of a first type on the first physical chassis via a first set of consecutive integers, the number of devices of the first type on the first physical chassis corresponding with the elements of the first set on a one-to-one basis;

wherein the first request refers to devices of the first type on the additional physical chassis via an additional set of consecutive integers, the number of devices of the first type on the additional physical chassis corresponding with the elements of the additional set on a one-to-one basis; and wherein the elements of the first set are mutually exclusive with the elements of the additional set; and wherein the last element of the first set and the first element of the additional set are consecutive.

11. The non-transitory storage medium of claim 9, wherein the first request is sent in a server manageability interface format;

wherein the first request comprises a header; and wherein the processor is further caused to adjust at least one bit in the header based on whether the first request is associated with the first physical chassis, the additional physical chassis, or the first physical chassis and the additional physical chassis.

12. The non-transitory storage medium of claim 9, wherein the processor is caused to disable a feature on the first physical chassis upon detection that the processor is to operate as a slave.

13. A method, comprising:

receiving a first request for one logical chassis;

sending, based on the first request, a query to an additional physical chassis;

receiving, based on the query, a reply from the additional physical chassis;

sending, based on the reply, a response to the first request for a first physical chassis and the additional physical chassis as the one logical chassis; and disabling a feature on the additional physical chassis upon detecting that the additional physical chassis is to operate as a slave physical chassis, wherein sending the query comprises referencing a data record, wherein the data record comprises a public portion and a private portion, the public portion referring to the first physical chassis and the additional physical chassis as the logical chassis, the private portion referring to the first physical chassis and the additional physical chassis as two logical chassis, wherein devices of the first physical chassis and devices of the additional physical chassis are operated as mutually exclusive sets of devices.

14. The method of claim 13, wherein the first request refers to devices of a first type on the first physical chassis via a first set of consecutive integers, the number of devices of the first type on the first physical chassis corresponding with the elements of the first set on a one-to-one basis;

wherein the first request refers to devices of the first type on the additional physical chassis via an additional set of consecutive integers, the number of devices of the first type on the additional physical chassis corresponding with the elements of the additional set on a one-to-one basis; and wherein the elements of the first set are mutually exclusive with the elements of the additional set; and wherein the last element of the first set and the first element of the additional set are consecutive.

15. The method of claim 13, wherein receiving the first request comprises receiving the first request in a server manageability interface format, the first request comprising a header;

adjusting at least one bit in the header based on whether the first request is associated with the first physical chassis, the additional chassis physical, or both the first physical chassis and the additional physical chassis.

16. The method of claim 13, further comprising disabling a feature on the additional physical chassis.

17. The method of claim 13, wherein sending the query comprises sending the query to the additional physical chassis via local area network ("LAN") and wherein receiving the answer comprises receiving the answer from the additional physical chassis via the LAN.

* * * * *